(12) United States Patent
Raut

(10) Patent No.: US 8,432,894 B2
(45) Date of Patent: Apr. 30, 2013

(54) ASYMMETRICAL FORWARDING IN LAYER 3 IP VPNS

(75) Inventor: Devendra Raut, Cupertino, CA (US)

(73) Assignee: Alcatel Lucent, Paris (FR)

( * ) Notice: Subject to any disclaimer, the term of this patent is extended or adjusted under 35 U.S.C. 154(b) by 869 days.

(21) Appl. No.: 11/712,161

(22) Filed: Feb. 27, 2007

(65) Prior Publication Data

US 2008/0205410 A1  Aug. 28, 2008

(51) Int. Cl.
*H04L 12/28* (2006.01)
*H04L 12/56* (2006.01)
*G06F 15/173* (2006.01)

(52) U.S. Cl.
USPC ........... 370/351; 370/389; 370/396; 709/238; 709/242; 709/243

(58) Field of Classification Search .................. 370/399, 370/351, 389, 396; 709/238, 242, 243
See application file for complete search history.

(56) References Cited

U.S. PATENT DOCUMENTS

| | | | |
|---|---|---|---|
| 7,698,456 B2 * | 4/2010 | Guichard et al. | 709/238 |
| 7,742,477 B1 * | 6/2010 | Guichard et al. | 370/392 |
| 2002/0181477 A1 * | 12/2002 | Mo et al. | 370/401 |
| 2003/0107996 A1 * | 6/2003 | Black et al. | 370/235 |
| 2003/0149755 A1 * | 8/2003 | Sadot | 709/223 |
| 2003/0191841 A1 * | 10/2003 | DeFerranti et al. | 709/226 |
| 2003/0223406 A1 | 12/2003 | Balay et al. | |
| 2005/0025069 A1 | 2/2005 | Aysan | |
| 2005/0120089 A1 * | 6/2005 | Kang et al. | 709/213 |
| 2006/0050653 A1 * | 3/2006 | Guichard et al. | 370/254 |
| 2006/0072589 A1 * | 4/2006 | Mandavilli et al. | 370/400 |
| 2006/0147204 A1 * | 7/2006 | Yasukawa et al. | 398/26 |
| 2007/0121524 A1 * | 5/2007 | Rangarajan et al. | 370/252 |
| 2007/0133406 A1 * | 6/2007 | Vasseur | 370/230 |
| 2010/0039959 A1 * | 2/2010 | Gilmartin | 370/254 |

OTHER PUBLICATIONS

E. Rosen & Y. Rekhter (Mar. 1999). "RFC 2547 BGP/MPLS VPNs". Internet Engineering Task Forc (IETF). http://www.ietf.org/rfc/rfc2547.txt.*

* cited by examiner

*Primary Examiner* — Phirin Sam
*Assistant Examiner* — Tarell Hampton
(74) *Attorney, Agent, or Firm* — Van Pelt, Yi & James, LLP

(57) ABSTRACT

A first forwarding instance is provided that includes a first set of routes. A second forwarding instance is provided that includes a second set of routes comprising a subset of the first set of routes. The first routing instance and the second routing instance are associated with a same virtual private routed network (VPRN).

21 Claims, 9 Drawing Sheets

ASYMMETRICAL FORWARDING IN LAYER 3 IP VPNS

BACKGROUND OF THE INVENTION

Layer 3 Virtual private network (L3VPN) customers sometimes desire to extend their VPN to vendors, customers, partners, or other external hosts but only for purposes of exchanging data with the VPN customer's hosts, as opposed to with each other. One technique to provide such an extension is the hub and spoke approach. Typically, hub and spoke service is provided in the context of a layer 3 virtual private network (L3 VPN) by using two virtual private routed network (VPRN) instances, one providing access to the entire VPN and the other usable to reach only destinations at the hub. In some applications, using two VPRNs is undesirable because of the cost or difficulty associated with using two ports, management overhead associated with the two VPRNs, running two instances of Border Gateway Protocol (BGP) on PE-CE interfaces, etc. It would be desirable to develop new routing techniques that can be used to extend a VPN to external hosts.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A first and second forwarding instance are provided that include a first and second set of routes, respectively, where the second set of routes is a subset of the first set of routes. The first and second forwarding instances are associated with the same virtual private routed network (VPRN). In some embodiments, the VPRN is in a control plane and the two forwarding instances are in a data plane. In some embodiments, the first and second forwarding instances are used to provide hub and spoke services. There may, for example, be cases in which a network administrator wants to permit forwarding of traffic to one node (e.g., a public node or one to which access is permitted) but not necessarily to another node. In some embodiments, the first and second forwarding instances are used in a wholesale-retail network. For example, retail traffic from an access side is routed using one of the forwarding instances through a billing or accounting hub so that the retailers are charge the proper amount.

Figure 1:
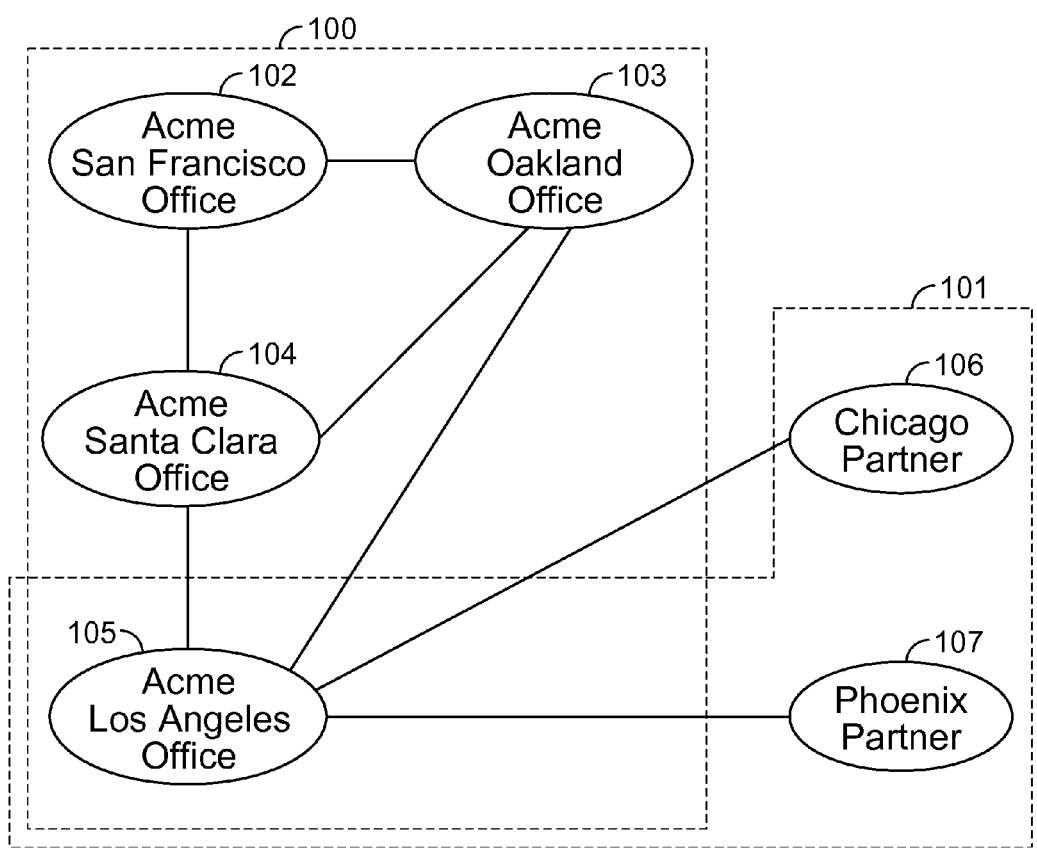
FIG. 1 is a diagram illustrating an embodiment of nodes in a hub and spoke network.

FIG. 1 is a diagram illustrating an embodiment of nodes in a hub and spoke network. In the example shown, group 100 includes nodes that are associated with offices of a company. The Acme company has offices in San Francisco, Oakland, Santa Clara, and Los Angeles corresponding to nodes 102-105, respectively. The San Francisco office (node 102) and the Oakland office (node 103) are connected, the San Francisco office (node 102) and the Santa Clara office (node 104) are connected, the Oakland office (node 103) and the Santa Clara office (node 104) are connected, the Oakland office (node 103) and the Los Angeles office (node 105) are connected, and the Santa Clara office (node 104) and the Los Angeles office (node 105) are connected.

Group 101 includes nodes 105-107, which are associated with the Acme Los Angeles office, a Chicago partner, and a Phoenix partner, respectively. The Chicago partner (node 106) is connected to the Acme Los Angeles office (node 105), and the Phoenix partner (node 107) is connected to Acme Los Angeles office (node 105).

In some embodiments, some or all of the nodes shown are associated with a layer 3 virtual private network (L3 VPN). In some embodiments, some or all of the nodes shown are associated with a VPRN. In some embodiments, associated with or included at each node is a router responsible for forwarding or routing traffic. In some embodiments, a router manages one or more forwarding instances, sometimes referred to as a routing table, used to route traffic. For example, a router may have one forwarding instance with one set of routes and another forwarding instance with another set of routes. In some embodiments, to have or otherwise allow multiple forwarding instances at a particular router, virtual routing and forwarding (VRF) is used. In some embodiments, some other protocol or technology is used besides these examples.

In this example, the Chicago partner (node 106) and the Phoenix partner (node 107) are not associated with each other and each wants to exchange data with the Acme Los Angeles office. For example, the Acme Los Angeles office may be a data center and the Chicago partner and the Phoenix partner want to access the data stored there. Acme does not necessarily want to permit the partners to be able to access the San Francisco, Santa Clara, or Oakland offices (e.g., because propriety or sensitive information is stored at the other offices).

What is disclosed is providing two or more forwarding instances where one forwarding instance has a subset of routes of the other forwarding instance. In some embodiments, node 105 has two forwarding instances to provide the desired accessibility (with respect to node 105) and the desired inaccessibility (with respect to nodes 102-104) where one forwarding instance has a route for node 105 (i.e., the Los Angeles office) and the other forwarding instance has routes for nodes 102-107 (i.e., all nodes in groups 100 and 101). In some embodiments, the two forwarding instances are in a data plane and are associated with the same entity or object in a corresponding control plane (e.g., the forwarding instances are associated with the same VPRN or the same route table manager). Traffic received at node 105 from nodes 106-107 are routed using the first forwarding instance in some embodiments and the partners are able to access the Los Angeles office but not the San Francisco, Oakland, or Santa Clara offices. Traffic received at node 105 from nodes 102-104 are forwarding or routed using the second forwarding instance with the superset of routes, for example so that traffic from any node in group 100 can be routed to any other node in group 100 and/or to other destinations (e.g., outside of group 100). Although some of the figures herein show two forwarding instances, in some embodiments there are three or more forwarding instances.

Figure 2:
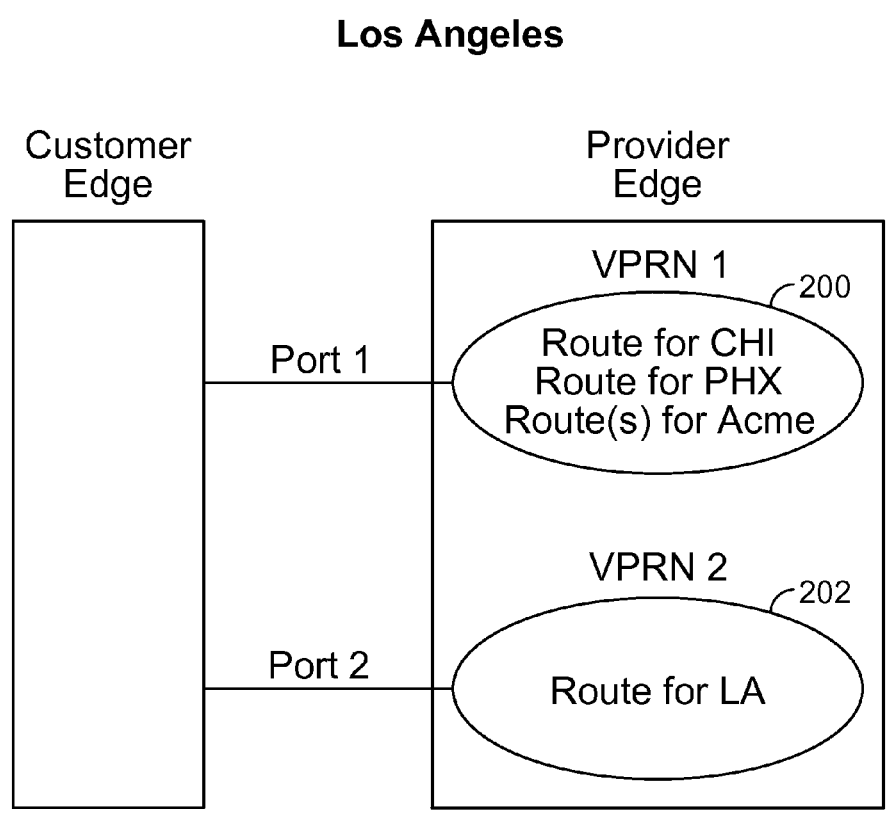
FIG. 2 is a diagram illustrating an example of an existing system used to provide hub and spoke service.

FIG. 2 is a diagram illustrating an example of an existing system used to provide hub and spoke service. In this example, node 105 of FIG. 1 is shown using an existing technique. Two VPRNs are used at a provider edge. VPRN 200 includes a route for the Chicago partner, the Phoenix partner, and one or more routes for Acme offices. VPRN 202 includes a route for the Acme Los Angeles office. VPRN 200 is associated with nodes 102-104 and/or traffic from those nodes. Similarly, VPRN 202 is associated with nodes 106-107 and/or traffic from those nodes. Each VPRN has its own port to a customer edge.

As used herein, access side refers to the side facing or an interface associated with the customer edge; the network side is in the opposite direction. For example, the San Francisco office, the Oakland office, and the Santa Clara office are on the access side with respect to the Los Angles office, and the Phoenix partner and the Chicago partner are on the network side. The terms access side and network side may be used to describe nodes, traffic, etc.

In some applications, some aspect of using two VPRNs as shown in this figure is undesirable. For example, ports may be limited or finite in number and using two ports may be costly. Other possible issues include route leaking, dynamic protocol binding from the Hub site, explicit configuration of the VPRNs, debug difficulties, etc.

Figure 3A:
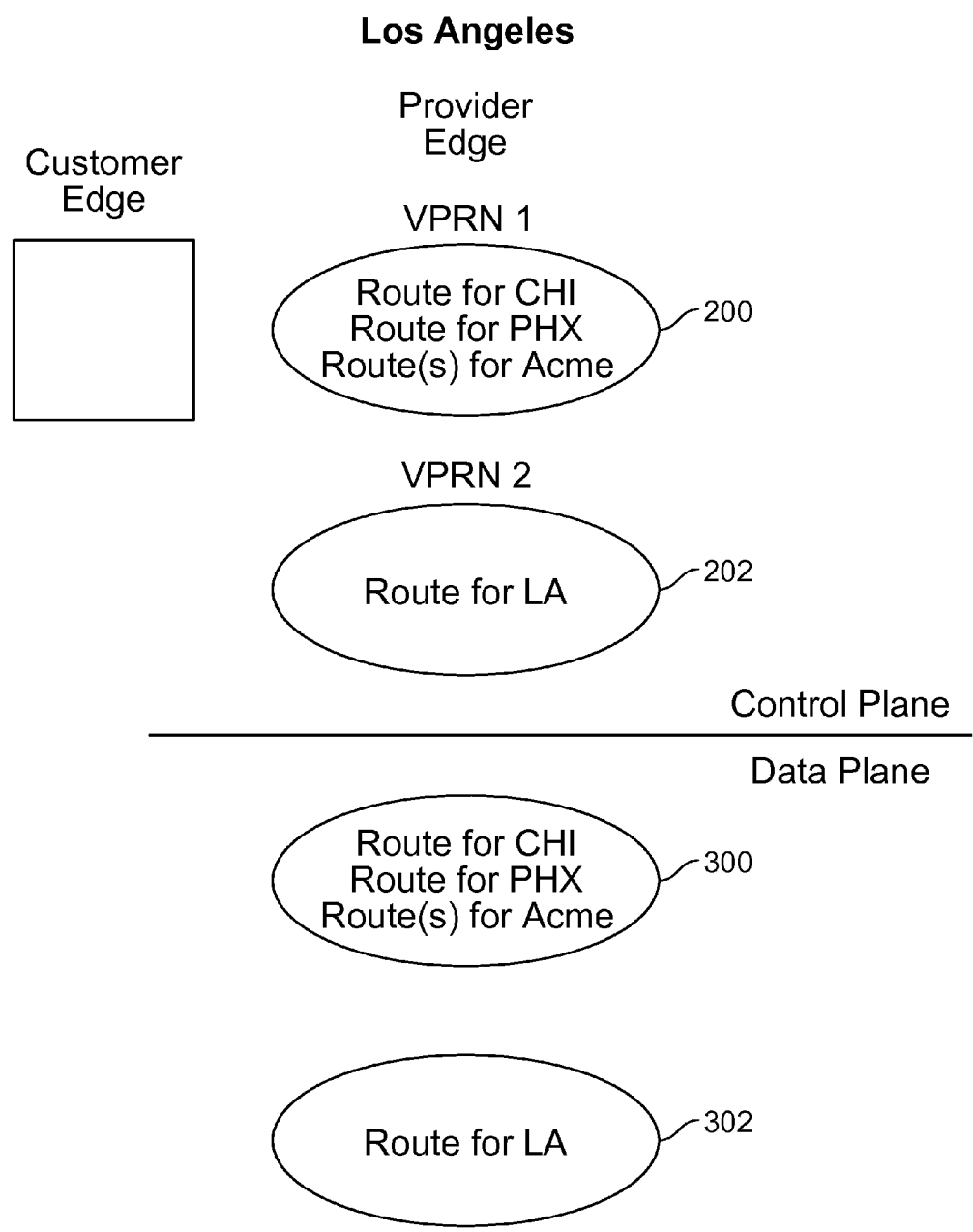
FIG. 3A is a diagram illustrating an example of an existing system within the context of a control plane and a data plane.

FIG. 3A is a diagram illustrating an example of an existing system within the context of a control plane and a data plane. In the example shown, VPRNs 200 and 202 of FIG. 2 are shown with respect to a control plane and a data plane. VPRNs 200 and 202 in the control plane are associated with forwarding instances 300 and 302 in the data plane, respectively.

Figure 3B:
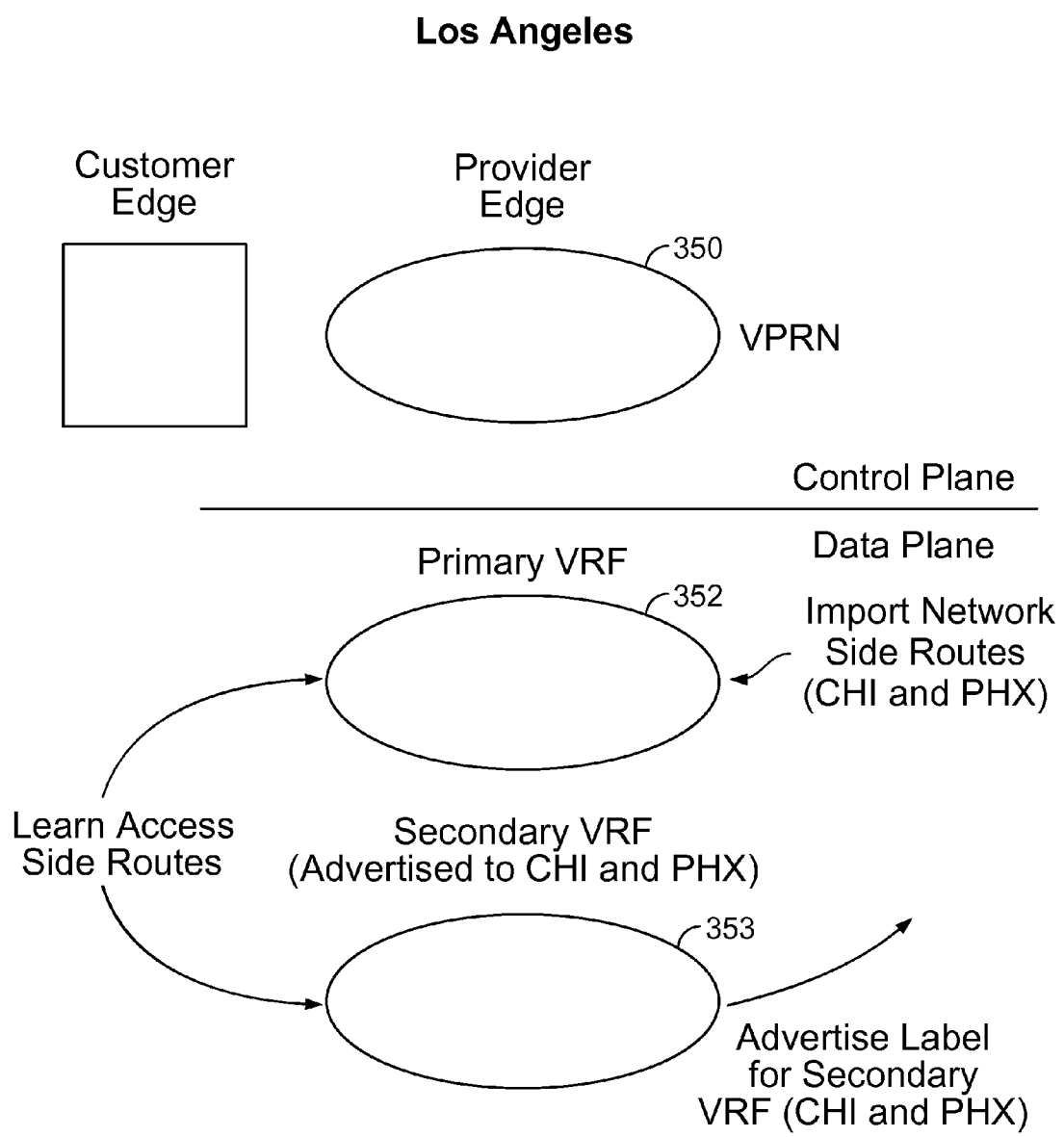
FIG. 3B is a diagram illustrating an embodiment of two forwarding instances with routes from an access side and/or a network side.

FIG. 3B is a diagram illustrating an embodiment of two forwarding instances with routes from an access side and/or a network side. In this figure, one embodiment of node 105 of FIG. 1 is shown. In some embodiments, the node shown (i.e., the Los Angeles office) is a hub for group 100 of FIG. 1. In this example, VRFs 352-353 are forwarding instances and are associated with the same VPRN in the control plane (i.e., VPRN 350). In some cases, a VPRN (such as VPRN 350) is referred to as a route table manager. In some embodiments, two or more forwarding instances are associated with some other session or instantiation in a control plane besides a VPRN.

Primary and secondary VRFs 352-353 learn access side routes (e.g., a route to a node on the access side such as the San Francisco, Oakland, or Santa Clara offices). In the example shown, different sets of routes are learned at primary and secondary VRFs 352-353. Primary VRF 352 in this example learns routes for one or more Acme offices, whereas secondary VRF 353 learns a route for the Los Angeles office. Network side routes are imported into primary VRF 352. For example, a route to the Chicago partner (node 106 in FIG. 1) and a route to the Phoenix partner (node 107 in FIG. 1) are imported into primary VRF 352.

A label associated with secondary VRF 353 is advertised in this example. In some embodiments, Border Gateway Protocol (BGP) or Multiprotocol BGP (MP-BGP) is used in advertising. Traffic from the network side then uses the advertised label and is routed using secondary VRF 353 as opposed to primary VRF 352.

In some embodiments, some other protocols or techniques are used. For example, some embodiments do not advertise a label or other identifier associated with a VRF. In some embodiments, the Los Angeles office (or other node) notes or records an association between one VRF (e.g., secondary VRF 353) and network side traffic or nodes and/or an association between another VRF (e.g., primary VRF 352) and access side traffic or nodes.

Figure 3C:
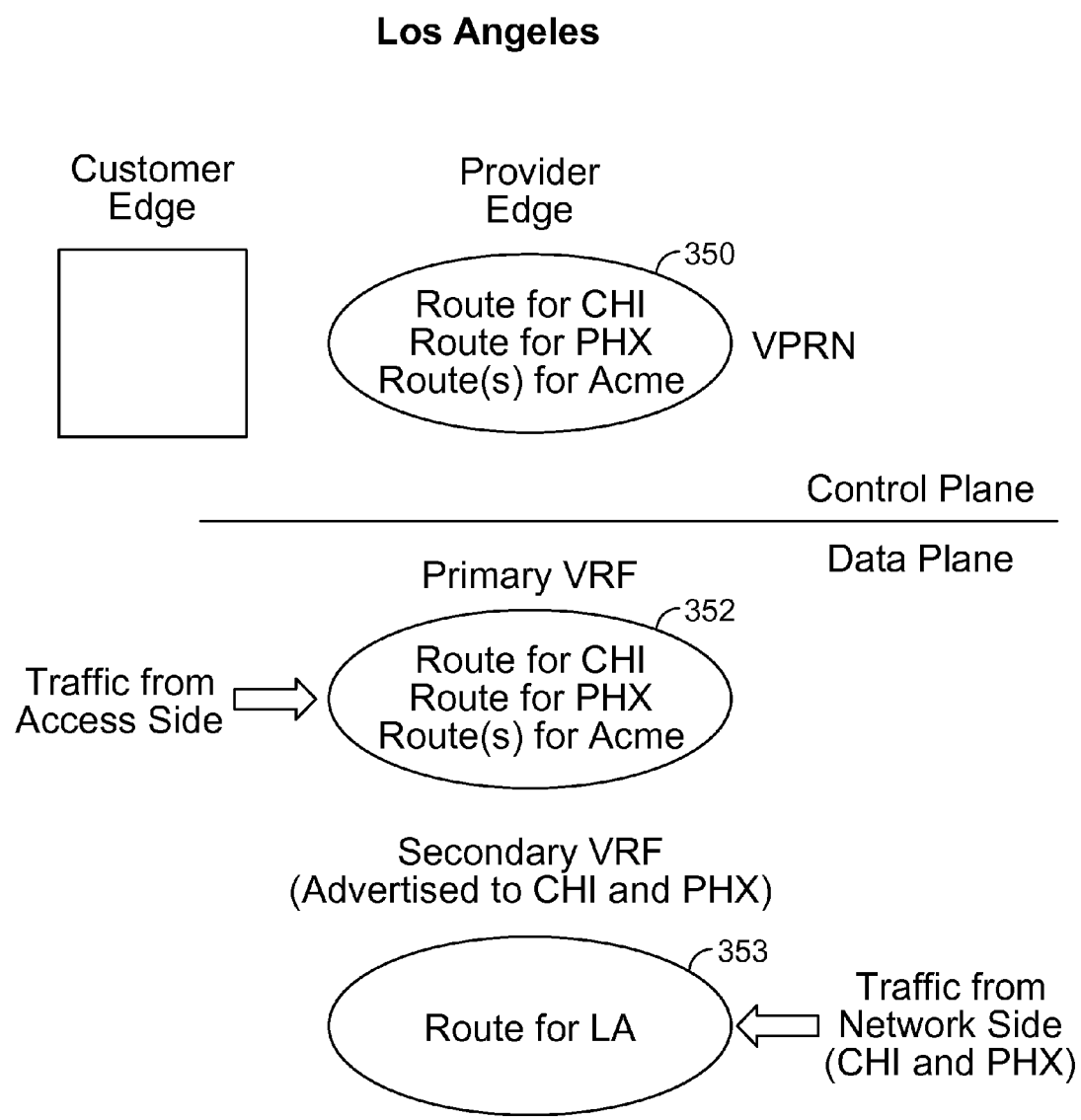
FIG. 3C is a diagram illustrating an embodiment of traffic from an access side and a network side directed to respective VRFs.

FIG. 3C is a diagram illustrating an embodiment of traffic from an access side and a network side directed to respective VRFs. In the example shown, traffic from the access side is forwarded using primary VRF 352. Referring back to FIG. 1, if (for example) traffic is received from the Santa Clara office (node 104), primary VRF 352 is used to route the received traffic. In this figure, primary VRF 352 includes routes for the Chicago partner, the Phoenix partner, and one or more Acme offices. Since traffic originating from a node in group 100 is forwarded using primary VRF 352, that traffic is able to be routed to any other node shown in FIG. 1.

Traffic from the network side uses the label associated with and is routed using secondary VRF 353. In this example, secondary VRF 353 includes a route for the Los Angeles office; secondary VRF 353 includes a subset of the routes included in primary VRF 352. Since traffic from the Chicago partner (node 106 in FIG. 1) and the Phoenix partner (node 107 in FIG. 1) are forwarded using secondary VRF 353, the partners are able to access the Los Angeles office as desired but are not necessarily able to access the other Acme offices.

Since there is only one VPRN in this embodiment, only a single port is required (e.g., to a customer edge). In some applications this is desirable, since there may be a limited number of ports.

In some embodiments, the techniques disclosed herein are agnostic with respect to or do not impact upper or top layers (e.g., of a control plane). For example, in some cases when a "show routes" command is performed or routes are announced to a remote provider edge (e.g., via MP-BGP), VPRN 350 may appear the same as any other VPRN (e.g., that only has one forwarding instance in the data plane). In some embodiments, this is attractive because there is (for example) only one instance of a Routing Instance and hence one BGP instance on a PE-CE interface.

Figure 4:
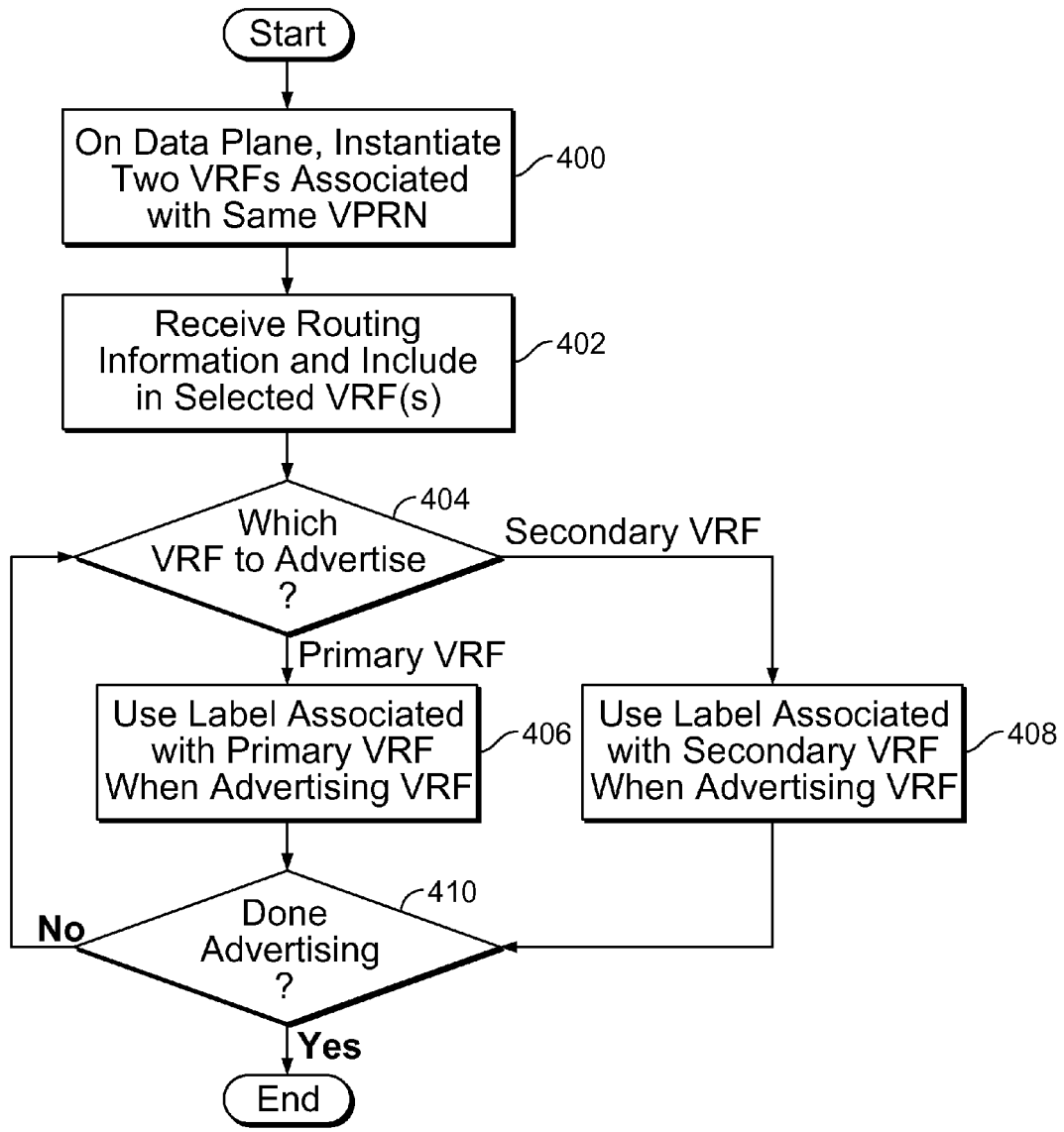
FIG. 4 is a flowchart illustrating an embodiment of a process for providing a primary and secondary VRF.

FIG. 4 is a flowchart illustrating an embodiment of a process for providing a primary and secondary VRF. In some embodiments, the example process is performed by the node shown in FIGS. 3B-3C. In the example shown, the secondary VRF has a subset of routes of the primary VRF.

At 400, two VRFs associated with the same VPRN are instantiated on a data plane. At 402, routing information is received and included in selected VRF(s). In some embodiments, routing information is received from the access side and/or the network side and is included in the primary VRF and/or the secondary VRF as appropriate. In some embodiments, the included routing information is used to forward traffic received at that node.

It is decided at 404 which VRF to advertise. In some embodiments, advertisement is a process associated with a network side, and a decision at 404 is based on which VRF is associated with the network side.

If it is decided to advertise the primary VRF, at 406 a label associated with the primary VRF is used when advertising a VRF. Otherwise, at 408 a label associated with the secondary VRF is used when advertising a VRF. In some embodiments, some other identifier is used besides a label. It is determined at 410 if advertising is done. If it is not done, it is decided at 404 which VRF to advertise next.

In the above figures, one example application is shown in which two forwarding instances are used in a hub and spoke network. In some embodiments, the techniques described are used in some other application or scenario. The following figures show some embodiments in which two forwarding instances are used in a wholesale-retail application.

Figure 5A:
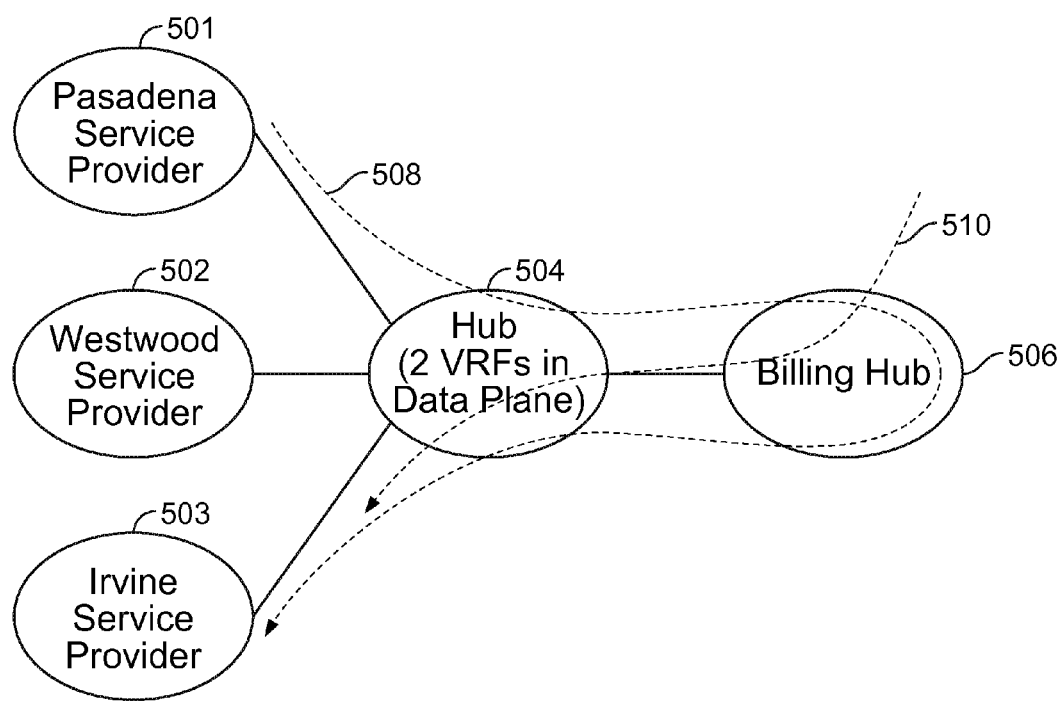
FIG. 5A is a diagram illustrating an embodiment of nodes in a wholesale-supplier network.

FIG. 5A is a diagram illustrating an embodiment of nodes in a wholesale-supplier network. In the example shown, a wholesaler sells network resources to a Pasadena service provider (node 501), a Westwood service provider (node 502), and an Irvine service provider (node 503). Each of the service providers services a particular neighborhood or region of the greater Los Angeles metropolitan area. For example, the Pasadena service provider may sell Internet access to customers in Pasadena.

In this example, each service provider is charged by the wholesaler based on actual usage of network resources (i.e., traffic). Billing hub 506 tracks the amount of traffic associated with each service provider and charges owed by each service provider is determined accordingly. To perform this accounting properly, the wholesaler would like to route traffic from one service provider to another service provider via billing hub 506 as opposed to a route that bypasses billing hub 506.

Route 508 shows one example route. Although the traffic associated with route 508 originates from Pasadena service provider 501 and is destined for Irvine service provider 503, the traffic is routed from Pasadena service provider 501 to hub 504, then to billing hub 506, back to hub 504, and finally to Irvine service provider 503. In some embodiments, similar routing via billing hub 506 is used to route traffic from a service provider to the same service provider (e.g., traffic that originates from and is destined for Westwood service provider 502).

Route 510 shows an example route for traffic originating from some node beyond billing hub 506. When received at hub 504, the traffic has already passed through billing hub 506 and is forwarded directly to Irvine service provider 503.

Figure 5B:
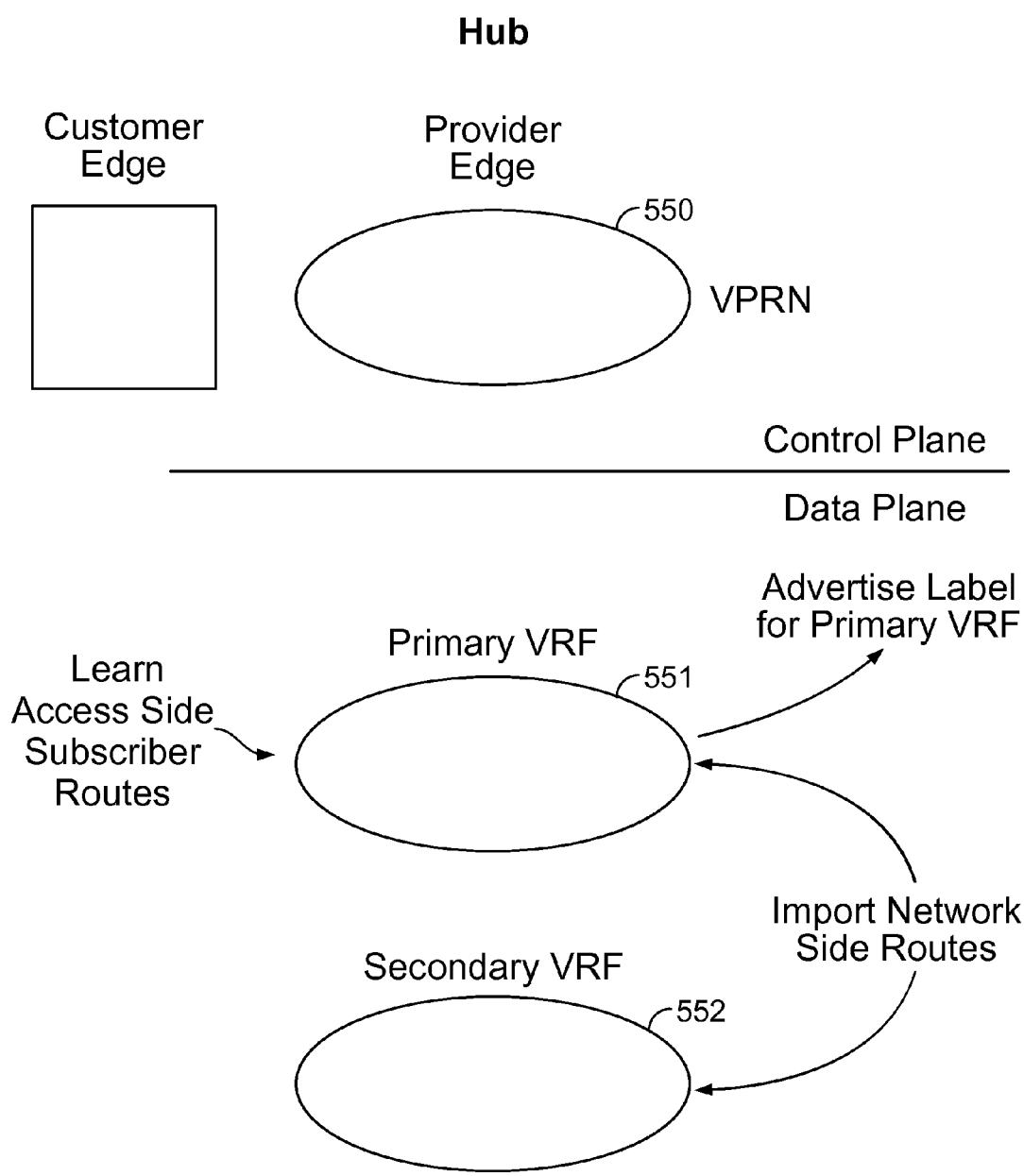
FIG. 5B is a diagram illustrating an embodiment of a hub in a wholesale-retail network configured to have two VRFs in a data plane.

FIG. 5B is a diagram illustrating an embodiment of a hub in a wholesale-retail network configured to have two VRFs in a data plane. In the example shown, one embodiment of hub 504 of FIG. 5A is shown. With respect to hub 504, the service providers (node 501-503) are on the access side and billing hub 506 is on the network side.

Primary VRF 551 and secondary VRF 552 in the data plane are both associated with VPRN 550 in the control plane. As described above with respect to FIGS. 3B-3C, a single (e.g., physical) port is used since there is only one VPRN. Primary VRF 551 learns access side subscriber routes (e.g., a route for Pasadena service provider 501, a route for Westwood service provider 502, and/or a route for Irvine service provider 503). Network side routes are imported to primary VRF 551 and secondary VRF 552, such as a route for billing hub 506.

A label associated with primary VRF 551 is advertised. For example, billing hub 506 and/or other nodes on the network side will use the advertised label, thus directing traffic from the network side to primary VRF 551.

Figure 5C:
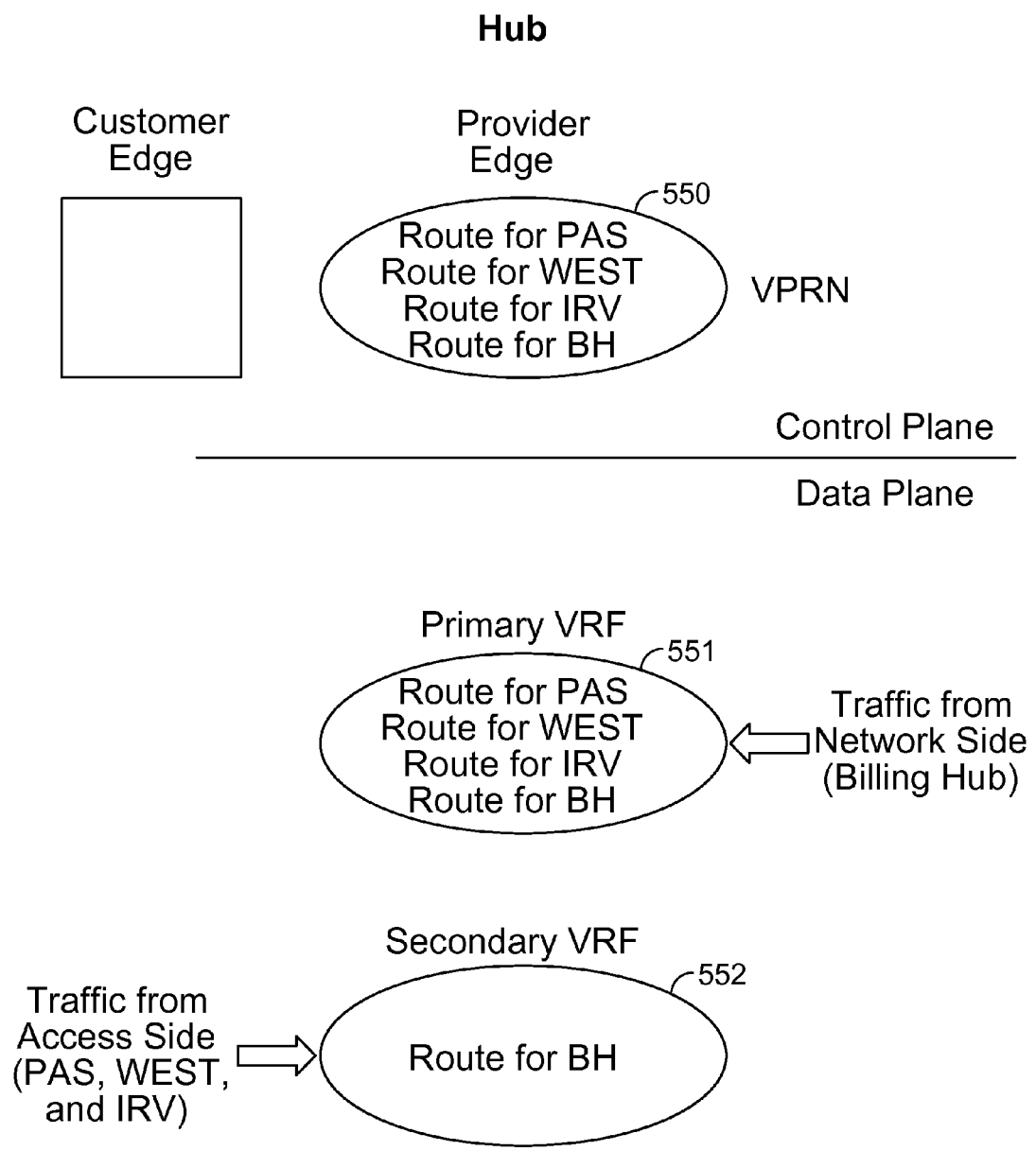
FIG. 5C is a diagram illustrating an embodiment of traffic from an access side and a network side of a hub that are forwarded using a secondary and primary VRF, respectively.

FIG. 5C is a diagram illustrating an embodiment of a traffic from an access side and a network side of a hub that are forwarded using a secondary and primary VRF, respectively. In the example shown, VPRN 550 includes routes for Pasadena service provider 501, Westwood service provider 502, Irvine service provider 503, and billing hub 506. Primary VRF 551 includes the same routes as VPRN 550. Secondary VRF includes a route for billing hub 506.

Since the label associated with primary VRF 551 was advertised, traffic from the network side (e.g., billing hub 506) is forwarded to primary VRF 551. If, for example, traffic destined for Irvine service provider 503 is received, primary VRF 551 is used to forward the traffic, corresponding to route 510 of FIG. 5A.

Traffic from the access side is passed to secondary VRF 552. For example, the traffic associated with route 508 of FIG. 5A originates from Pasadena service provider and is forwarded using secondary VRF 552. Since there is no route for the destination (i.e., Irvine service provider 503), the traffic associated with route 508 is forwarded to billing hub 506 since secondary VRF 552 includes a route for the billing hub. When the traffic associated with route 508 returns from billing hub 506, it will be from the network side and is processed using primary VRF 551 this time around and is forwarded to Irvine service provider 503. Similarly, other traffic received from one service provider (destined for the same/another service provider) is processed using secondary VRF 552 and is routed to billing hub 506 and when returned by billing hub 506 is processed using primary VRF 551.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   using a processor to provide a first forwarding instance that includes a first set of routes, wherein the first set of routes includes a route to a first node and a route to a second node;
   using the processor to provide a second forwarding instance that includes a second set of routes comprising a subset of the first set of routes, wherein the second set of routes includes a route to the first node and excludes a route to the second node;
   associating the first forwarding instance and the second forwarding instance with a route table manager in a control plane, such that as a result of the association the first forwarding instance and the second forwarding instance use a same port;

using the processor to advertise, on an access side that is facing a customer edge, a first label associated with the first forwarding instance;

using the processor to advertise, on a network side, a second label associated with the second forwarding instance; and routing traffic based at least in part on label and intended destination, including by:

in the event the traffic is associated with the first label and the first node is the intended destination of the traffic, routing the traffic using the route to the first node included in the first forwarding instance;

in the event the traffic is associated with the first label and the second node is the intended destination of the traffic, routing the traffic using the route to the second node included in the first forwarding instance;

in the event the traffic is associated with the second label and the first node is the intended destination of the traffic, routing the traffic using the route to the first node included in the second forwarding instance; and in the event the traffic is associated with the second label and the second node is the intended destination of the traffic, refraining from routing the traffic to the second node.

2. A method as recited in claim 1, wherein the first forwarding instance and the second forwarding instance are associated with a same physical port of a device on which the first forwarding instance and the second forwarding instance are provided.

3. A method as recited in claim 1, wherein the first forwarding instance and the second forwarding instance are associated with virtual routing and forwarding (VRF).

4. A method as recited in claim 1, wherein the first forwarding instance is used to forward network traffic received from a subset of nodes associated with a virtual private routed network (VPRN).

5. A method as recited in claim 1 further comprising advertising the first forwarding instance to a subset of nodes associated with a virtual private routed network (VPRN).

6. A method as recited in claim 5, wherein advertising includes using a label associated with the first forwarding instance.

7. A method as recited in claim 5, wherein advertising includes using Multiprotocol Border Gateway Protocol (MP-BGP).

8. A method as recited in claim 1, wherein the first and second forwarding instances are provided at a provider edge device and the method further comprises advertising the first forwarding instance to one or more nodes associated with a network side interface of the provider edge device.

9. A method as recited in claim 1 further comprising advertising the second forwarding instance to a subset of nodes associated with a virtual private routed network (VPRN).

10. A method as recited in claim 1, wherein the first and second forwarding instances are provided at a provider edge device and the method further comprises advertising the second forwarding instance to one or more nodes associated with a network side interface of the provider edge device.

11. A method as recited in claim 1, wherein the first and second forwarding instances are provided at a provider edge device and the first forwarding instance includes one or more routes from the access side and the network side and the second forwarding instance only includes one or more routes from the network side.

12. A method as recited in claim 1, wherein the first forwarding instance is associated with traffic from a first set of nodes and the second forwarding instance is associated with traffic from a second set of nodes.

13. A method as recited in claim 1 further comprising:

receiving routing information associated with another node;

selecting the first forwarding instance, the second forwarding instance, or both to add the routing information to; and adding the routing information to the selected forwarding instance(s).

14. A system, comprising:

a router configured to:

provide a first forwarding instance that includes a first set of routes, wherein the first set of routes includes a route to a first node and a route to a second node;

provide a second forwarding instance that includes a second set of routes comprising a subset of the first set of routes, wherein the second set of routes includes a route to the first node and excludes a route to the second node;

provide a route table manager in a control plane associated with the first forwarding instance and the second forwarding instance, such that as a result of the association the first forwarding instance and the second forwarding instance use a same port; and route traffic based at least in part on label and intended destination, including by:

in the event the traffic is associated with a first label associated with the first forwarding instance and the first node is the intended destination of the traffic, route the traffic using the route to the first node included in the first forwarding instance;

in the event the traffic is associated with the first label and the second node is the intended destination of the traffic, route the traffic using the route to the second node included in the first forwarding instance;

in the event the traffic is associated with a second label associated with the second forwarding instance and the first node is the intended destination of the traffic, route the traffic using the route to the first node included in the second forwarding instance; and in the event the traffic is associated with the second label and the second node is the intended destination of the traffic, refrain from routing the traffic to the second node; and an interface configured to:

advertise, on an access side that is facing a customer edge, the first label associated with the first forwarding instance; and advertise, on a network side, the second label associated with the second forwarding instance.

15. A system as recited in claim 14, wherein the router is further configured to advertise the first forwarding instance to a subset of nodes associated with a virtual private routed network (VPRN).

16. A system as recited in claim 14, wherein the router provides the first and second forwarding instances at a provider edge device and the first forwarding instance includes one or more routes from the access side and the network side and the second forwarding instance only includes one or more routes from the network side.

17. A system as recited in claim 14, wherein the router is further configured to:

receive routing information associated with another node;

select the first forwarding instance, the second forwarding instance, or both to add the routing information to; and add the routing information to the selected forwarding instance(s).

18. A computer program product, the computer program product being embodied in a non-transitory computer readable storage medium and comprising computer instructions for:

providing a first forwarding instance that includes a first set of routes, wherein the first set of routes includes a route to a first node and a route to a second node;

providing a second forwarding instance that includes a second set of routes comprising a subset of the first set of routes, wherein the second set of routes includes a route to the first node and excludes a route to the second node;

associating the first forwarding instance and the second forwarding instance with a route table manager in a control plane, such that as a result of the association the first forwarding instance and the second forwarding instance use a same port;

advertising, on an access side that is facing a customer edge, a first label associated with the first forwarding instance;

advertising, on a network side, a second label associated with the second forwarding instance; and routing traffic based at least in part on label and intended destination, including by:
in the event the traffic is associated with the first label and the first node is the intended destination of the traffic, routing the traffic using the route to the first node included in the first forwarding instance;
in the event the traffic is associated with the first label and the second node is the intended destination of the traffic, routing the traffic using the route to the second node included in the first forwarding instance;
in the event the traffic is associated with the second label and the first node is the intended destination of the traffic, routing the traffic using the route to the first node included in the second forwarding instance; and
in the event the traffic is associated with the second label and the second node is the intended destination of the traffic, refraining from routing the traffic to the second node.

19. A computer program product as recited in claim 18, the computer program product further comprising computer instructions for advertising the first forwarding instance to a subset of nodes associated with a virtual private routed network (VPRN).

20. A computer program product as recited in claim 18, wherein the first and second forwarding instances are provided at a provider edge device and the first forwarding instance includes one or more routes from the access side and the network side and the second forwarding instance only includes one or more routes from the network side.

21. A computer program product as recited in claim 18, the computer program product further comprising computer instructions for:

receiving routing information associated with another node;

selecting the first forwarding instance, the second forwarding instance, or both to add the routing information to; and adding the routing information to the selected forwarding instance(s).

\* \* \* \* \*